(12) United States Patent
Erickson et al.

(10) Patent No.: US 6,866,698 B2
(45) Date of Patent: Mar. 15, 2005

(54) HYDROGEN PURIFICATION APPARATUS

(75) Inventors: Albert William Erickson, Narvon, PA (US); Richard Mark Paczewski, Ambler, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/392,144

(22) Filed: Mar. 19, 2003

(65) Prior Publication Data

US 2004/0182239 A1 Sep. 23, 2004

(51) Int. Cl.[7] ............................................. B01D 53/22
(52) U.S. Cl. ...................................... 95/56; 96/4
(58) Field of Search .......................... 95/45, 55, 56; 96/4, 7–9, 11

(56) References Cited

U.S. PATENT DOCUMENTS

| | | | | | |
|---|---|---|---|---|---|
| 3,258,896 | A | * | 7/1966 | Muller | 95/8 |
| 4,255,963 | A | * | 3/1981 | Down | 73/19.1 |
| 4,422,859 | A | * | 12/1983 | McGee | 95/11 |
| 4,472,176 | A | * | 9/1984 | Rubin | 95/56 |
| 4,732,583 | A | * | 3/1988 | DeLong et al. | 95/55 |
| 5,053,058 | A | * | 10/1991 | Mitariten | 95/8 |
| 5,064,446 | A | * | 11/1991 | Kusuki et al. | 95/53 |
| 5,137,547 | A | * | 8/1992 | Chretien | 95/55 |
| 5,154,878 | A | * | 10/1992 | Busigin et al. | 376/310 |
| 5,205,841 | A | * | 4/1993 | Vaiman | 95/46 |
| 5,827,569 | A | * | 10/1998 | Akiyama et al. | 427/243 |
| 5,928,415 | A | * | 7/1999 | Girard et al. | 96/4 |
| 5,955,044 | A | | 9/1999 | Lucht et al. | |
| 6,168,650 | B1 | | 1/2001 | Buxbaum | |
| 6,273,937 | B1 | * | 8/2001 | Schucker | 95/45 |
| 6,387,157 | B1 | * | 5/2002 | Yamashita | 95/45 |
| 6,569,226 | B1 | * | 5/2003 | Dorris et al. | 95/56 |

FOREIGN PATENT DOCUMENTS

JP  10-165781  6/1998

OTHER PUBLICATIONS

British Search Report dated Sep. 4, 2003, from Application No. GB 0307040.6.

* cited by examiner

*Primary Examiner*—Robert H. Spitzer
(74) *Attorney, Agent, or Firm*—RatnerPrestia

(57) ABSTRACT

An apparatus for purifying a hydrogen feed stream, comprising a hydrogen diffusion membrane, a first feed line for supplying a hydrogen feed stream and a second feed line for supplying a purge gas, is disclosed. A flow-restricting device is located in the second feed line. Apparatus for purging a hydrogen purification apparatus, methods for purifying a hydrogen stream and methods for purging a hydrogen purification apparatus are also disclosed.

24 Claims, 2 Drawing Sheets

US 6,866,698 B2

HYDROGEN PURIFICATION APPARATUS

FIELD OF THE INVENTION

The present invention relates to apparatus for purifying a hydrogen stream, apparatus for purging a hydrogen purification apparatus, methods for purifying a hydrogen stream and methods for purging a hydrogen purification apparatus.

BACKGROUND OF THE INVENTION

Hydrogen is an important industrial gas and is used in a number of applications such as ammonia synthesis, methanol synthesis, chemical hydrogenation, metal manufacture, glass processing and fuel cells. For many applications, the hydrogen must be free of impurities, so techniques for hydrogen purification have been developed. Ultra-high purity hydrogen is required for the manufacture of integrated circuits, creating the need for improved hydrogen purification processes. Commercially available hydrogen typically contains impurities including carbon monoxide, carbon dioxide, oxygen, nitrogen, water and methane, and these components must be separated from the hydrogen.

One method of purifying hydrogen uses palladium or palladium alloy membranes. The membranes are selectively permeable, and only hydrogen will pass through. The hydrogen is thus separated from the impurities. Typically the membranes function at temperatures in excess of 300° C., particularly 350° C.–400° C. A conventional hydrogen purification apparatus based on a hydrogen diffusion membrane comprises a chamber, a membrane located within the chamber, a heater for heating the membrane, and gas lines allowing the flow of gas streams into and out of the chamber.

When the membrane purification apparatus is turned off, either deliberately or by an external event such as a power outage, hydrogen must be removed from the system whilst the membrane is still hot (>300° C.) or hydrogen embrittlement of the membrane can occur leading to damaged, leaking membranes. Purge systems are used to remove hydrogen from the chamber containing the membrane. Typically nitrogen is introduced into the chamber in an attempt to flush out any hydrogen from the chamber.

Conventional purge systems can take at least thirty minutes to remove hydrogen from the chamber, by which time the membrane has cooled below 300° C. and there is a considerable risk of damage to the membrane. It is an object of the present invention to reduce the time needed to purge all hydrogen from the chamber of the hydrogen purification apparatus.

When the purification apparatus is re-started, it is desirable to remove nitrogen from the chamber as quickly as possible and switch to maximum hydrogen flow, so that the purification process can begin. It is a further object of the invention to reduce the time needed to start up a purged hydrogen purification apparatus.

In conventional purge systems, there is a risk that when the nitrogen flow is switched back to hydrogen flow, the resulting pressure surge can damage the membrane. It is a yet further object of the invention to reduce pressure surges within the apparatus so that the lifetime of the membrane is increased.

BRIEF SUMMARY OF THE INVENTION

Accordingly the present invention provides an apparatus for purifying hydrogen feed stream, comprising
a chamber having a first inlet and, optionally, a second inlet for supplying gas streams into the chamber, and a first outlet and a second outlet for removing gas streams from the chamber;
a first feed line for supplying a hydrogen feed stream, which is connected to the first inlet;
a hydrogen diffusion membrane which is located such that any gas that passes through the membrane will exit the chamber through the second outlet and any gas that does not pass through the membrane will exit the chamber through the first outlet;
a second feed line for supplying a purge gas, which is connected to the first inlet or the second inlet;
a bleed line, which is connected to the first outlet;
a product line, which is connected to the second outlet; and
at least one valve located in each of the first and second feed lines, the bleed line and the product line;
characterised in that a flow-restricting device is located in the second feed line.

The purge gas is a substantially inert gas such as nitrogen.

DETAILED DESCRIPTION OF THE INVENTION

Figure 1:
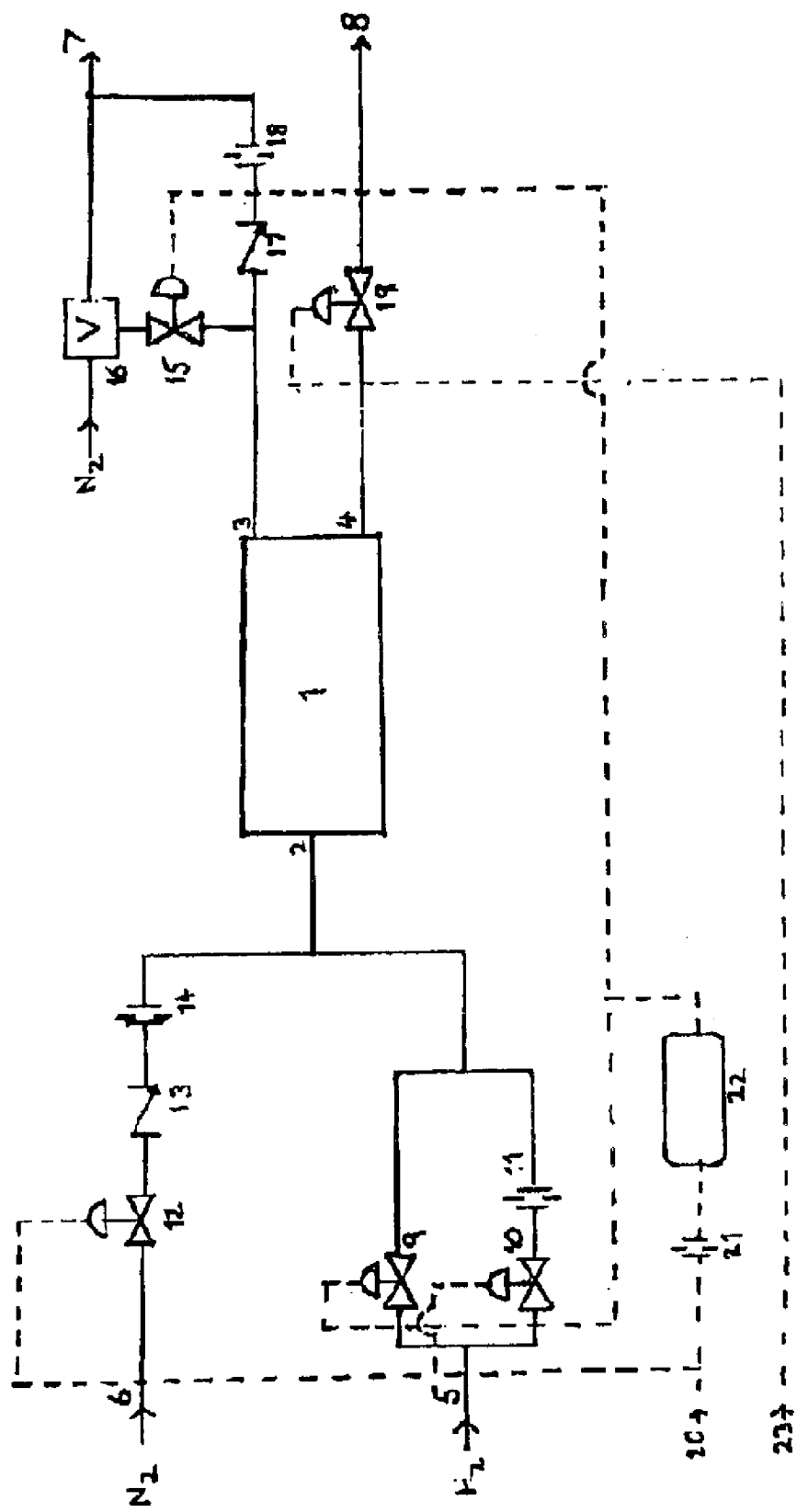
FIG. 1 is a schematic diagram of an embodiment of an apparatus for purifying a hydrogen feed stream according to the present invention.

The inventors have found that the provision of a flow-restricting device in the second feed line reduces the time needed to purge gas from the chamber. The pressure on the feed side of the chamber is significantly lower than in conventional purge systems that do not have a flow-restricting device in the second feed line. The lower pressure results in a significantly shorter purge time. The shorter purge time reduces the risk of hydrogen remaining in the chamber when the temperature has fallen below 300° C., and the risk of damaging the membrane is reduced.

The first feed line is a line through which hydrogen is supplied to the chamber; the second feed line is a line through which a purge gas is supplied to the chamber. As hydrogen and the purge gas do not need to be supplied to the chamber at the same time, the first feed line and the second feed line can be, in part or in whole, the same gas supply line. For example, the hydrogen and the purge gas can be supplied at a single inlet of a single gas supply line, but the line may subsequently split so that, due to the operation of valves, the hydrogen and purge gas take different routes to the chamber. The split gas lines can subsequently recombine, and the single gas supply line is connected to the chamber at the first inlet. A flow-restricting device is located in the second feed line insofar as the purge gas must pass through a flow-restricting device before entering the chamber.

Suitably, flow-restricting devices are also located in the first feed line and the bleed line. The inventors have found that the provision of a flow-restricting device in the first feed line allows the gas pressure to build up gradually in the chamber after a shut down, so that there is no pressure surge and reduced risk of damage to the membrane. The flow-restricting device in the bleed line regulates the flow of the impure gas stream to the vent during the purification process.

Preferably the apparatus also comprises a vacuum generating device in the bleed line. The inventors have found that creating a negative pressure on the chamber helps to further reduce the purge time.

The chamber is preferably a welded stainless steel cylinder. The first and second feed lines, the bleed line and the product line are preferably made from high purity stainless steel tubing and are suitably welded to the chamber at the inlet and outlet points.

The hydrogen diffusion membrane is suitably a palladium or palladium alloy membrane. Suitable alloying metals include gold, silver, mercury, platinum, iridium, rhodium, ruthenium and osmium, preferably silver. Other hydrogen diffusion membranes include a tungsten/tantalum combination. The membrane may be in the form of a tube, wherein tubes constructed of the membrane material are coiled within a vessel such that the impure hydrogen stream is passed through the coils such that hydrogen can pass through the membrane and enter into the area within the vessel outside of the coiled tube. This area must be connected to the second outlet so that pure hydrogen can exit the chamber into the product line. The impurities do not pass through the membrane, so they exit the tube and subsequently exit the chamber through the first outlet. Alternatively the membrane may be in the form of a plate or foil. The membrane can also be in the form of a thin-film coating on a ceramic substrate.

There is suitably at least one heater located within or adjacent to the chamber. Preferably there are two heaters in the chamber. In a preferred embodiment there is a heater for heating the gas diffusion membrane, and one for heating the gas supplied at the first inlet.

The term "flow-restricting device" is used to describe a component that restricts and thus regulates the flow of gas through a line. By contrast a valve that simply stops and starts the flow of gas through a line, such as a pneumatic valve, is not a "flow-restricting device" for the purposes of the present description. A "flow-directing valve" stops the flow of gas in a single direction.

The flow-restricting devices can be flow control orifices, needle valves or flow distributors, but are preferably flow control orifices. A flow control orifice is a plate with a hole, which is placed in the gas line, thus controlling the flow of gas through the line. Suitably the hole has been laser drilled so that it is extremely small. The diameter of the hole is suitably between 5 $\mu$m–5000 $\mu$m, preferably between 10 $\mu$m–2000 $\mu$m, most preferably between 20 $\mu$m–1000 $\mu$m. The flow rate through a flow control orifice does not vary as long as the pressure differential across the opening is above a threshold value. Above the threshold the downstream pressure can vary, but the flow rate remains constant. Below the threshold value, the flow rate will change as the pressure differential across the opening changes. When the apparatus of the present invention is in use, the pressure differential across the openings in any flow control orifices may be above the threshold value, but may also be below the threshold value. Flow control orifices are preferable to other flow control devices because there are no mechanical parts that might leak or fail, and no adjustment of the device is required during operation.

The valves in the feed lines, bleed line and product line are suitably pneumatic valves or electrically actuated valves, but are preferably pneumatic valves because this avoids the hazards associated with the use of spark-producing electrical equipment near gases such as hydrogen. The valves are used to stop and start the supply of the feed streams, and to stop and start the exit of the impure and purified gas streams through the bleed line and product line.

In a preferred embodiment, the hydrogen purification apparatus comprises a pneumatic valve system wherein the valves have a "normal" position (open or closed) and can be switched to the opposite position by applying air pressure to the valve via an air control line. Suitably the valve or valves in the first feed line are closed in their normal position. Preferably two metal diaphragm valves are located in the first feed line and a flow-restricting device is downstream of one of the valves. Suitably the valve or valves in the second feed line are open in their normal position. Preferably, one bellows valve is located in the second feed line and a flow-restricting device is downstream of the valve. Suitably the valve or valves in the bleed line are open in their normal position. Preferably, one bellows valve is located in the bleed line. Suitably the valve or valves in the product line are closed in their normal position.

Suitably the valves are controlled by at least one air control line. Preferably the air control line is configured such that certain valves can be actuated immediately, and other valves can be actuated after a delay. A suitable timing device that can be inserted into the air control line comprises a flow-restricting device and a reservoir. The flow-restricting device reduces the flow of air and the reservoir must be filled with air before the valves which are downstream of the reservoir are actuated. The flow-restricting device is suitably a flow control orifice, which is preferably coupled with a flow directing valve such as a check valve that allows the pneumatic air pressure to bypass the flow control orifice and vent the pneumatic air quickly. The reservoir is suitably a stainless steel cylinder. In a preferred embodiment, the flow control orifice and the reservoir are sized to achieve a 20 second time delay.

Suitably the valve(s) in the second feed line and at least one valve in the first feed line are actuated immediately by the air control line. Suitably the valve(s) in the bleed line are downstream of the timing device in the air control line so are actuated after a time delay. Delaying the actuation of the valve in the bleed line means that the valve in the bleed line closes some time after the gas supply has switched from the purge gas to the hydrogen feed stream. This means that the hydrogen feed stream can flow through the chamber for a short period at start-up to flush the purge gas, e.g. nitrogen, from the chamber. As a result, full purifier performance can be achieved quickly.

In a preferred embodiment, the first feed line is split so that it comprises two sections through which gas can flow. Suitably there is a first valve in a first section and a second valve in a second section. The first valve is suitably upstream of the timing device in the air control line, and a second valve is suitably downstream of the timing device. Preferably there is a single flow-restricting device in the first feed line and it is located in the first section of the feed line, downstream of the first valve. Therefore, when the air pressure is first applied to the air control line, the first valve will open immediately and the hydrogen feed stream will pass through the first valve and then through the flow-restricting device, which will regulate the flow of the hydrogen feed stream. The initial supply of the hydrogen feed stream to the chamber is therefore controlled, and the pressure of gas in the chamber will slowly increase. After the time delay the second valve will open, and the hydrogen feed stream can pass through the second valve and then into the chamber. As there is no flow-restricting device downstream of the second valve there is unrestricted flow of the hydrogen feed stream into the chamber and full performance can be achieved. In this embodiment the pressure surge that occurs when hydrogen purification is started or resumed is reduced. The time taken to reach full pressure in the chamber will be of the order of 20 seconds.

In a preferred embodiment, the valves in the first and second feed lines and the bleed line are controlled by a first air control line, and the one or more valves in the product line are controlled by a second air control line.

There may be flow-directing valves in the feed lines, bleed line and product line that have the purpose of ensuring that gas flows in only one direction, thus preventing unwanted backflow. Suitably the flow-directing valves are check valves. If the first feed line and second feed line are both connected to the first inlet, then there is suitably a flow-directing valve that prevents the flow of the hydrogen feed stream from the first feed line into the second feed line.

The vacuum generating device that may be located in the bleed line is used to hasten the removal of gases from the chamber. The vacuum generating device could be a vacuum pump, but is preferably a venturi. Venturis are well-known vacuum generating devices and are made up of a converging conical section, a straight section and a diverging conical section. A gas, such as pressurised nitrogen, is passed through the venturi and a vacuum is generated in a vacuum port which is perpendicular to the straight section of the venturi. Venturis are reliable, having no moving parts, and are very compact. If a nitrogen supply is used to purge the chamber this can also be used to supply nitrogen to the venturi.

The vacuum generating device is preferably located downstream of the one or more valves in the bleed line. In a preferred embodiment the bleed line is split so that it comprises two sections through which the gas can flow. In the first section there is a valve, and a vacuum generating device which is downstream of the valve. In the second section there is a flow-restricting device. When the valve is closed, there is a controlled flow of gas through the second section of the bleed line and all the gas has to pass through the flow-restricting device. When the valve is open, the gas can also flow through the first section and the flow is hastened by the action of the vacuum generating device. Suitably there is a flow-directing valve in the second section of the bleed line, upstream of the flow-restricting device. This prevents the flow of gas from the outlet side of the vacuum generating device from bleeding back into the vacuum side of the vacuum generating device.

The present invention further provides a purge apparatus for attachment to a hydrogen purification apparatus wherein the hydrogen purification apparatus comprises a chamber having a first inlet and, optionally, a second inlet for supplying gas streams into the chamber; a first outlet and a second outlet for removing gas streams from the chamber; and a hydrogen diffusion membrane which is located such that any gas that passes through the membrane will exit the chamber through the second outlet and any gas that does not pass through the membrane will exit the chamber through the first outlet;

and wherein the purge apparatus comprises a first feed line for supplying a hydrogen feed stream, which is connectable to the first inlet;

a second feed line for supplying a purge gas, which is connectable to the first inlet or the second inlet;

a bleed line, which is connectable to the first outlet;

a product line, which is connectable to the second outlet;

at least one valve located In each of the first and second feed lines, the bleed line and the product line; and a flow-restricting device located in the second feed line.

Suitably the purge apparatus further comprises flow-restricting devices in the first feed line and the bleed line. Preferably the purge apparatus also comprises a vacuum generating device in the bleed line.

The purge apparatus may be attached to a state-of-the-art hydrogen purification apparatus. The purge apparatus, when fitted to a hydrogen purification apparatus, suitably has all the features of the hydrogen purification apparatus as described herein.

The invention further provides a method for purging a hydrogen purification apparatus comprising the steps of a) stopping the supply of a hydrogen feed stream to a chamber by closing one or more valves in a first feed line which is connected to the chamber at a first inlet;

b) supplying a purge gas to the chamber by opening one or more valves in a second feed line which is connected to the chamber at the first inlet or at a second inlet;

c) allowing the exit of gas from the apparatus through a bleed line, which is connected to the chamber at a first outlet, by opening one or more valves in the bleed line; and d) stopping the exit of gas through a product line, which is connected to the chamber at a second outlet, by closing one or more valves in the product line;

characterised in that In step (b) the purge stream is supplied to the chamber via a flow-restricting device which is located in the second feed line.

Preferably, steps (a)–(d) are carried out simultaneously.

The method suitably further comprises step (e):

e) switching on a vacuum generating device which is located in the bleed line.

If the vacuum generating device is a venturi, a gas stream such as nitrogen should be supplied to the venturi.

The invention further provides a method for purifying a hydrogen feed stream using a hydrogen purification apparatus of the invention.

The hydrogen purification apparatus will now be described with reference to a specific embodiment, which is meant to be illustrative and not limiting of the invention. The apparatus is described with reference to FIG. 1 which is a diagrammatic representation of the apparatus.

The apparatus is a hydrogen purification apparatus comprising a chamber (1) which is a welded stainless steel cylinder. The chamber (1) contains a palladium silver alloy membrane, a heater for heating the membrane and a heater for heating the feed gas. The chamber has one inlet (2) and two outlets (3, 4). A hydrogen feed line (5) is connected to the inlet (2). A nitrogen feed line (6) is also connected to the inlet (2). A bleed line (7) is connected to one outlet (3), and a product line (8) is connected to the other outlet (4). The feed lines, bleed line and product line (3, 4, 5, 6) are all made of high purity stainless steel tubing.

The hydrogen line (5) is split so that it has two sections. Each section contains a high purity metal diaphragm valve (9, 10) that is normally closed. One of the sections contains a flow control orifice (11), having a 700 $\mu$m orifice, which is downstream of a valve (10).

The nitrogen line (6) contains a high purity metal bellows valve (12) which is normally open. Downstream of the valve (12) there is a check valve (13) which prevents the flow of hydrogen into the nitrogen line (6). Downstream of the check valve (13) there is a flow control orifice (14), having a 150 $\mu$m orifice.

Although the hydrogen and nitrogen lines are represented as separate gas lines, they may actually start as a single gas supply line, which subsequently splits into two lines. This is possible because there is no requirement for nitrogen and hydrogen pressure to be supplied simultaneously, and the valves will ensure that the gases travel down the correct lines.

The bleed line (7) is split so that it has two sections. In one section there is a high purity metal bellow valve (15) which is normally open. Downstream of the valve (15) there is a venturi (16). Nitrogen is supplied to the venturi. In the other section of the bleed line (7) there is a check valve (17) which ensures that exhausted nitrogen does not bleed back into the vacuum side of the venturi during the purge step. Downstream of the check valve (17) there is a flow control orifice (18).

The product line (8) contains a valve (19) which is normally closed.

The apparatus further comprises two air control lines (20, 23) which control all the pneumatic valves. One air control line (20) contains a flow control orifice (21) and a reservoir (22) downstream of the flow control orifice (21). The valve (12) in the nitrogen line and one of the valves (10) in the hydrogen line are connected to the air control line (20) upstream of the timing device which comprises the flow control orifice (21) and the reservoir (22). One of the valves (9) in the hydrogen line and the valve (15) in the bleed line are connected to the air control line (20) downstream of the timing device (21,22). The valve (19) in the product line is connected to a different air control line (23).

To purify hydrogen, the heaters in the chamber (1) are turned on and hydrogen is supplied to the hydrogen line (5). Air pressure is applied to both air control lines (20,23). The valve (12) in the nitrogen line will close immediately. One of the valves (10) in the hydrogen line will open immediately. Hydrogen will flow through the valve (10) and through the flow control orifice (11). As hydrogen passes through the orifice, the pressure in the chamber (1) will slowly increase. The hydrogen will pass through the chamber (1) and will sweep any remaining nitrogen to the bleed line (3) where it will pass through the valve (15) and the venturi (16) (or alternatively through the check valve (17) and the flow control orifice (18)).

After the time delay due to the flow control orifice (21) and the reservoir (22), the second valve (9) in the hydrogen line will open and the valve (15) in the bleed line will close. When the second valve (9) in the hydrogen line is opened, there is unrestricted flow of hydrogen to the chamber (1) and full performance can be achieved. When the valve (15) in the bleed line closes, the flow of hydrogen must pass through the check valve (17) and the flow control orifice (18). The hydrogen bleed flow carries impurities out of the cell and prevents the accumulation of impurities on the surface of the membrane.

The valve in the product line (8) will open due to the air pressure on the control line (23). When this happens, hydrogen can diffuse through the membrane and ultra pure hydrogen flows through the product line.

To purge the cell, air pressure is vented from the air control lines (20, 23). The valve (12) in the nitrogen feed line immediately opens. The valves (9, 10) in the hydrogen feed line immediately close. The valve (15) in the bleed line immediately opens. The valve (19) in the product line immediately closes. Hydrogen stops flowing because the valves in the hydrogen line (9, 10) and the product line (8) are shut. Nitrogen flows through valve (12) and the check valve (13) and trickles through the flow control orifice (14). The nitrogen passes through the chamber (1), purging any remaining hydrogen. The purged gases pass into the bleed line (7) and can pass through the valve (15) and the venturi (16) (or can pass through the check valve (17) and the flow control orifice (18)).

Figure 2:
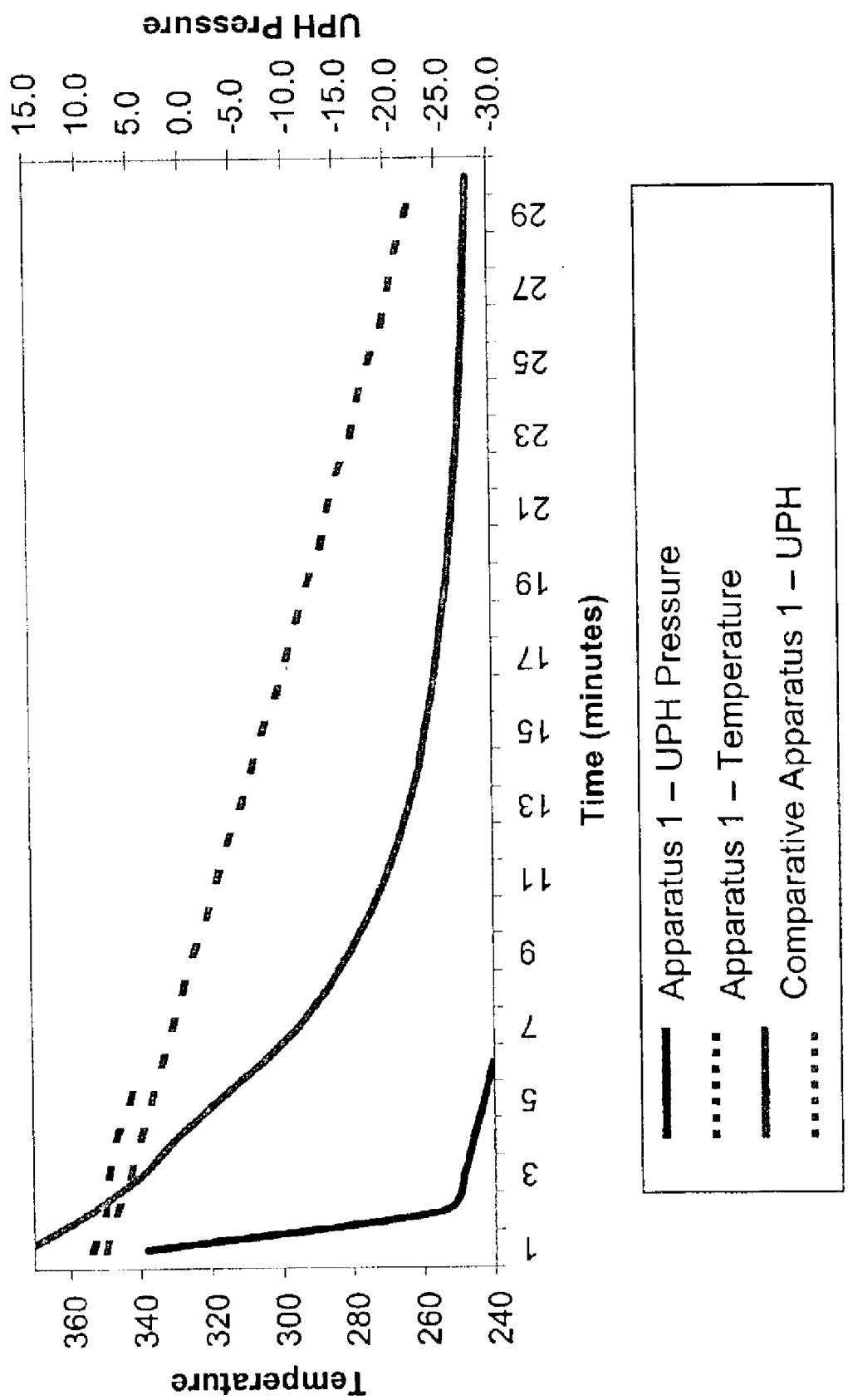
FIG. 2 is a plot of temperature and pressure versus time for the purging process of a hydrogen purification apparatus according to an embodiment of the present invention.

FIG. 2 shows the time taken to purge a hydrogen purification apparatus of the present invention (Apparatus 1), as shown diagrammatically in FIG. 1. This is compared to the time taken to purge a hydrogen purification apparatus wherein there is not a flow control orifice in the nitrogen line (Comparative Apparatus 1). The purge was commenced by venting the air pressure from the air control lines, thus opening the valves in the nitrogen feed line and the bleed line, and closing the valves in the hydrogen feed line and the product line. 80 psig (about 550 kPa gauge) nitrogen was supplied to the nitrogen line and to the venturi. The heaters were turned off when the purge was commenced.

The graph shows the temperature decrease in the chamber during the purge, which is roughly the same for Apparatus 1 and Comparative Apparatus 1. The graph also shows the pressure measured by a pressure gauge which was located between the cell body and the first valve in the product line (denoted UPH pressure). Pressure greater than atmospheric (0 on the graph) is measured in psig, and pressure less than atmospheric is measured as inches of mercury. When the pressure levels off, it is assumed that the apparatus is purged. The time taken to purge Apparatus 1 is less than 7 minutes, whereas Comparative Apparatus 2 takes 30 minutes.

What is claimed is:

1. A method for purging a hydrogen purification apparatus comprising the steps of:
    a) stopping the supply of a hydrogen feed stream to a chamber by closing one or more valves in a first feed line which is connected to the chamber at a first inlet;
    b) supplying a purge gas to the chamber by opening one or more valves in a second feed line which is connected to the chamber at the first inlet or at a second inlet;
    c) allowing the exit of gas from the apparatus through a bleed line, which is connected to the chamber at a first outlet, by opening one or more valves in the bleed line; and
    d) stopping the exit of gas through a product line, which is connected to the chamber at second outlet, by closing one or more valves in the product line;
wherein in step (b) the purge stream is supplied to the chamber via a flow-restricting device which is located in the second feed line.

2. A method according to claim 1, wherein steps (a)–(d) are carried out simultaneously.

3. A method according to claim 1, wherein the method further comprises the step of
    a) switching on a vacuum generating device which is located in the bleed line.

4. A method for purifying a hydrogen feed stream with a hydrogen purification apparatus comprising a chamber having a first inlet and, optionally, a second inlet for supplying gas streams into the chamber, and a first outlet and a second outlet for removing gas streams from the chamber,
    a first feed line for supplying a hydrogen feed stream, which is connected to the first inlet,
    a hydrogen diffusion membrane which is located such that any gas that passes through the membrane will exit the chamber through the second outlet and any gas that does not pass through the membrane will exit the chamber through the first outlet,
    a second feed line for supplying a purge gas, which is connected to the first inlet or the second inlet,
    a bleed line, which is connected to the first outlet,
    a product line, which is connected to the second outlet,
    at least one valve located in each of the first and second feed lines, the bleed line and the product line, and
    a flow-restricting device located in the second feed line, the method comprising the steps of:

supplying the feed stream to the chamber by opening the at least one valve in the first feed line; and removing ultra pure hydrogen from the apparatus by opening the at least one valve in the product line.

5. An apparatus for purifying a hydrogen feed stream, comprising a chamber having a first inlet and, optionally, a second inlet for supplying gas streams into the chamber, and a first outlet and a second outlet for removing gas streams from the chamber;

a first feed line for supplying a hydrogen feed stream, which is connected to the first inlet;

a hydrogen diffusion membrane which is located such that any gas that passes through the membrane will exit the chamber through the second outlet and any gas that does not pass through the membrane will exit the chamber through the first outlet;

a second feed line for supplying a purge gas, which is connected to the first inlet or the second inlet;

a bleed line, which is connected to the first outlet;

a product line, which is connected to the second outlet;

at least one valve located in each of the first and second feed lines, the bleed line and the product line; and a flow-restricting device located in the second feed line.

6. An apparatus according to claim 5, wherein the purge gas is nitrogen.

7. An apparatus according to claim 6, wherein the hydrogen diffusion membrane is a palladium or palladium alloy membrane.

8. An apparatus according to claim 5 further comprising additional flow-restricting devices located in the first feed line and the bleed line.

9. An apparatus according to claim 5 further comprising at least one heater located within or adjacent to the chamber.

10. An apparatus according to claim 5, wherein the flow-restricting device located in the second feed line is a flow control orifice.

11. An apparatus according to claim 5, wherein the at least one valve in the feed lines, the bleed line and the product line is a pneumatic valve.

12. An apparatus according to claim 11, wherein each valve has a normal position selected from open or closed and the apparatus further comprises a pneumatic valve system for switching the at least one valve to the opposite position by applying air pressure to the at least one valve via at least one air control line.

13. An apparatus according to claim 12, wherein the valve(s) in the first feed line are closed in their normal position, the valve(s) in the second feed line are open in their normal position, the valve(s) in the bleed line are open in their normal position and the valve(s) in the product line are closed in their normal position.

14. An apparatus according to claim 13, wherein the at least one air control line comprises a first air control line and a second air control line, and the valves in the first and second feed lines and the bleed line are controlled by a first air control line, and the valve(s) in the product line are controlled by a second air control line.

15. An apparatus according to claim 12, wherein the air control line is configured such that certain valves can be actuated immediately, and other valves can be actuated after a delay.

16. An apparatus according to claim 15 further comprising a further flow-restricting device and a reservoir inserted into the at least one air control line.

17. An apparatus according to claim 15, wherein the valve(s) in the second feed line and the at least one valve in the first feed line are actuated immediately by the air control line and the valve(s) in the bleed line are actuated after a time delay.

18. An apparatus according to claim 15, wherein the first feed line is split so that it comprises a first section and a second section through which gas can flow, and the at least one valve in the first feed line comprises a first valve in the first section and a second valve in the second section, the first valve is actuated immediately by the air control line, and a second valve is actuated after a time delay.

19. An apparatus according to claim 18 further comprising a further flow-restricting device in the first feed line which is located in the first section of the feed line, downstream of the first valve.

20. An apparatus according to claim 5 further comprising a vacuum generating device in the bleed line.

21. An apparatus according to claim 20, wherein the vacuum generating device is a venturi.

22. An apparatus according to claim 20, wherein the bleed line is split so that it comprises a first section and a second section through which the gas can flow and in the first section there is a valve and a vacuum generating device which is downstream of the valve, and in the second section there is an additional flow-restricting device.

23. A purge apparatus for attachment to a hydrogen purification apparatus wherein the hydrogen purification apparatus comprises a chamber having a first inlet and, optionally, a second inlet for supplying gas streams into the chamber; a first outlet and a second outlet for removing gas streams from the chamber; and a hydrogen diffusion membrane which is located such that any gas that passes through the membrane will exit the chamber through the second outlet and any gas that does not pass through the membrane will exit the chamber through the first outlet;

and wherein the purge apparatus comprises:

a first feed line for supplying a hydrogen feed stream, which is connectable to the first inlet;

a second feed line for supplying a purge gas, which is connectable to the first inlet or the second inlet;

a bleed line, which connectable to the first outlet;

a product line, which is connectable to the second outlet;

at least one valve located in each of the first and second feed lines, the bleed line and the product line; and a flow-restricting device located in the second feed line.

24. A purge apparatus according to claim 23 further comprising additional flow-restricting devices in the first feed line and the bleed line and a vacuum generating device in the bleed line.

* * * * *